United States Patent
Zheng et al.

(10) Patent No.: US 11,855,878 B2
(45) Date of Patent: Dec. 26, 2023

(54) INFORMATION PROCESSING METHOD, INTERCONNECTION DEVICE AND COMPUTER-READABLE STORAGE MEDIUM

(71) Applicant: Shanghai Biren Technology Co., Ltd, Shanghai (CN)

(72) Inventors: Qin Zheng, Shanghai (CN); Zhou Hong, Shanghai (CN); YuFei Zhang, Shanghai (CN); Lin Chen, Shanghai (CN); ChengKun Sun, Shanghai (CN); Tong Sun, Shanghai (CN); ChengPing Luo, Shanghai (CN); HaiChuan Wang, Shanghai (CN)

(73) Assignee: Shanghai Biren Technology Co., Ltd, Shanghai (CN)

( * ) Notice: Subject to any disclaimer, the term of this patent is extended or adjusted under 35 U.S.C. 154(b) by 97 days.

(21) Appl. No.: 17/524,688

(22) Filed: Nov. 11, 2021

(65) Prior Publication Data
US 2022/0158929 A1    May 19, 2022

(30) Foreign Application Priority Data
Nov. 16, 2020   (CN) .......................... 202011275787.4

(51) Int. Cl.
*H04L 45/42* (2022.01)
*H04L 45/00* (2022.01)
*H04L 12/18* (2006.01)

(52) U.S. Cl.
CPC ............ *H04L 45/20* (2013.01); *H04L 12/185* (2013.01); *H04L 12/1836* (2013.01); *H04L 45/42* (2013.01)

(58) Field of Classification Search
CPC ...... H04L 45/20; H04L 12/1836; H04L 45/42
USPC ......................................................... 709/238
See application file for complete search history.

(56) References Cited

U.S. PATENT DOCUMENTS

| | | | |
|---|---|---|---|
| 2008/0219269 A1* | 9/2008 | Minkenberg ............ | H04L 12/66 370/395.4 |
| 2012/0051231 A1* | 3/2012 | Ou .......................... | H04L 12/18 370/248 |

* cited by examiner

*Primary Examiner* — Sibte H Bukhari
(74) *Attorney, Agent, or Firm* — JCIP GLOBAL INC.

(57) ABSTRACT

An information processing method, an interconnection device, and a computer-readable storage medium are provided. The interconnection device includes a request processing module configured for: receiving a data access request from at least one processor, wherein the data access request comprises a merge bit, a multicast group identifier (MGID), and a multicast transaction identifier (MTID); determining whether the data access request is a multicast request; determining whether the interconnection device receives other multicast requests if it is determined that the data access request is a multicast request based on the MGID, the MTID, and a static routing policy of a multicast group; and obtaining the other multicast requests if it is determined that the interconnection device receives the other multicast requests, merging the multicast request with the other multicast requests into a merged request, and forwarding the merged request to a next-hop device of the interconnection device.

15 Claims, 7 Drawing Sheets

US 11,855,878 B2

INFORMATION PROCESSING METHOD, INTERCONNECTION DEVICE AND COMPUTER-READABLE STORAGE MEDIUM

CROSS-REFERENCE TO RELATED APPLICATION

This application claims the priority benefit of China application serial no. 202011275787.4, filed on Nov. 16, 2020. The entirety of the above-mentioned patent application is hereby incorporated by reference herein and made a part of this specification.

BACKGROUND

Technical Field

The disclosure generally relates to the field of multiprocessors, and in particular, relates to an interconnection device, an information processing method in the interconnection device, and a computer-readable storage medium.

Description of Related Art

In many fields that require rapid execution of a large number of operations, multi-processor systems have been extensively used. A typical multi-processor system includes a plurality of processors and a plurality of memories, which are connected together by an interconnection network formed by switches and physical transmission links. The plural processors usually execute the same program and access the same data in the memory in exactly the same order. For instance, in a parallel computing system in the field of artificial intelligence (AI) that performs model parallel processing on neural networks, multiple processors are programmed to read the same neural network model parameters from memory and use the parameters to process different batches of data. These processors read the same parameter data in exactly the same order.

FIG. 1 is a schematic view illustrating a topology of a multi-processor system 1 provided by the related art. As shown in FIG. 1, the multi-processor system 1 includes a plurality of processors $10_1, 10_2, \ldots,$ and $10_N$ (where N is a positive integer greater than 1, and is also collectively referred to as processors 10 hereinafter), a plurality of memories $30_1, 30_2, \ldots,$ and $30_M$ (where M is a positive integer greater than 1, and is also collectively referred to as memories 30 hereinafter), and an interconnection network 200 connected to the processors 10 and the memories 30. Herein, the interconnection network 200 includes a plurality of interconnection devices $20_1, 20_2, 20_3, \ldots$ (also collectively referred to as interconnection devices 20 hereinafter) and physical links 201, 202, 203, 204 . . . between the interconnection devices 20 and the processors 10, between the interconnection devices 20 and the memories 30, and among the interconnection devices 20. In the embodiments, the physical links from the processors 10 to the memories 30 are sometimes referred to as an uplink physical links (e.g., the physical links 201, 203, 205, 207, . . . ), and the physical links from the memories 30 to the processors 10 are sometimes referred to as an downlink physical links (e.g., the physical links 202, 204, 206, 208, . . . ). However, a person having ordinary skill in the art may understand that a pair of uplink physical link and downlink physical link may be a multiplexed physical line or may be two separate physical lines. In addition, the uplink and downlink provided herein are only used to distinguish the direction of information transmission on the physical link, and do not indicate any up or down positional relationship.

In the multi-processor system 1 shown in FIG. 1, if the processors 10 are required to obtain specific data from a specific memory 30, each processor is required to read the data from the memory 30 individually. In this way, the consumption of memory access bandwidth and network link bandwidth is many times greater than the bandwidth required by each individual processor. For instance, as shown in FIG. 1, it is assumed that four processors $10_i, 10_j, 10_m,$ and $10_n$ read the same data from one memory $30_k$. The processors $10_i$ and $10_j$ are connected to the interconnection device $20_2$ respectively through the uplink physical links 201 and 203, and the processors $10_m$ and $10_n$ are connected to the interconnection device $20_3$ respectively through the uplink physical links 205 and 207. The interconnection devices $20_2$ and $20_3$ are connected to the interconnection device $20_1$ respectively through the uplink physical links 209 and 211, and the interconnection device $20_2$ is connected to the memory $30_k$ through the uplink physical link 213. In this case, the same data will need to be read 4 times from the memory $30_k$, which consumes 4 times the memory access bandwidth. Further, the uplink physical link 213 needs to transmit 4 access requests for the data, and the downlink physical link 214 needs to transmit response data 4 times, The uplink physical links 209 and 211 need to transmit two access requests for the data, and the downlink physical links 210 and 212 need to transmit response data twice, which consumes up to 4 times the link bandwidth. When there are more memories accessing the same data, the consumption of memory access bandwidth and network link bandwidth will be greater, causing a huge burden on the entire network.

One way to solve the above problem is to add a cache at the memories 30. When specific data is read from the memories 30 for the first time, the read data is stored in the cache. Subsequently, the read request for the data from other processors 10 may be directly obtained from the cache without having to access the memories 30 with lower bandwidth again. In this case, as long as the requested data is in the cache (i.e., a cache hit), the low-speed memories 30 only need to be accessed once at the first request. However, on the one hand, this method may only alleviate the bandwidth bottleneck of the low-speed memories, and may not solve the problem of link bandwidth consumption found in the interconnection network 200. On the other hand, the implementation costs of high-speed cache are high, but the data access bandwidth it can provide is only several times higher than that provided by the low-speed memories most of the time, and the amount of data that it can cache is 2-3 orders of amount lower than that of low-speed memories. Therefore, for applications such as neural network processing, this method cannot be used to completely solve the memory access bandwidth problem.

Another way to address the abovementioned problem is the introduction of general-purpose multicast write technology. One processor or multicast co-processor reads data from a specific memory 30, and then sends the data to a plurality of request processors 10 through a multicast write operation. In this case, the low-speed memory 30 only needs to be accessed once, and for the interconnection network 200 supporting the multicast write operation (that is, the interconnection device 20 can simultaneously send data to multiple downlink physical links), the data only needs to be sent once on one downlink physical link. However, this method requires significant changes to the programming method of the multi-processor system 1. Instead of the almost universally used request-response method in which each individual processor 10 independently accesses data in the memory 30, the processors 10 are required to coordinate to initiate and complete data accessing. This significantly increases programming complexity and makes the programming model incompatible with existing software. In addition, if the interconnection network 200 does not support multicast writing (for example, almost all on-chip interconnection networks do not support multicast writing), the transmission bandwidth consumption on the links of the interconnection network 200 may not be reduced.

SUMMARY

With an aim to solve at least one of the aforementioned problems, the disclosure provides an interconnection device for an interconnection network capable of reducing memory access bandwidth consumption and transmission bandwidth consumption on the interconnection network.

According to one aspect of the disclosure, the disclosure provides an interconnection device. The interconnection device is configured for an interconnection network. The interconnection network includes a plurality of interconnection devices. The interconnection devices are connected to a plurality of processors and memories. The interconnection device includes a request processing module configured for receiving a data access request from at least one processor in a multicast group of the processors. The data access request includes a merge bit, a multicast group identifier (MGID), and a multicast transaction identifier (MTID). The MTID is configured to identify an outstanding data access request from the multicast group for a target data unit of a destination memory among the memories. The request processing module is further configured for determining whether the data access request is a multicast request based on the merge bit. The multicast request is allowed to be merged with other multicast requests. If it is determined that the data access request is a multicast request, based on the MGID, the MTID, and a static routing policy of the multicast group, the request processing module determines whether the interconnection device receives other multicast requests. The other multicast requests come from other processors in the multicast group and have the same MGID and MTID. If it is determined that the interconnection device receives the other multicast requests, the request processing module obtains the other multicast requests, merges the multicast request with the other multicast requests into a merged request, and forwards the merged request to a next-hop device of the interconnection device.

According to another aspect of the disclosure, the disclosure further provides an information processing method. The method includes the following steps. A data access request from at least one processor in a multicast group of a plurality of processors is received in an interconnection device. The data access request includes a merge bit, a multicast group identifier (MGID), and a multicast transaction identifier (MTID). The MTID is configured to identify an outstanding data access request from the multicast group for a target data unit of a destination memory among a plurality of memories. The processors and the memories are connected through a plurality of interconnection devices of an interconnection network. It is determined whether the data access request is a multicast request based on the merge bit. The multicast request is allowed to be merged with other multicast requests. If it is determined that the data access request is a multicast request, based on the MGID, the MTID, and a static routing policy of the multicast group, it is determined whether the interconnection device receives other multicast requests. The other multicast requests come from other processors in the multicast group and have the same MGID and MTID. If it is determined that the interconnection device receives the other multicast requests, the other multicast requests are obtained, and the multicast request is merged with the other multicast requests into a merged request. The merged request is forwarded to a next-hop device of the interconnection device.

According to still another aspect of the disclosure, the disclosure further provides an interconnection device. The interconnection device includes at least one processing unit and at least one storage unit. The at least one storage unit is coupled to the at least one processing unit and stores an instruction configured for being executed by the at least one processing unit. When the instruction is executed by the at least one processing unit, the interconnection device executes the steps of the information processing method.

According to yet another aspect of the disclosure, the disclosure further provides a computer-readable storage medium provided with a computer program code. The computer program code executes the steps of the information processing method when being executed.

BRIEF DESCRIPTION OF THE DRAWINGS

The disclosure will be better understood by referring to the description of the specific embodiments of the disclosure provided in the following drawings, and other purposes, details, features, and advantages of the disclosure will become more obvious.

DESCRIPTION OF THE EMBODIMENTS

Figure 1:
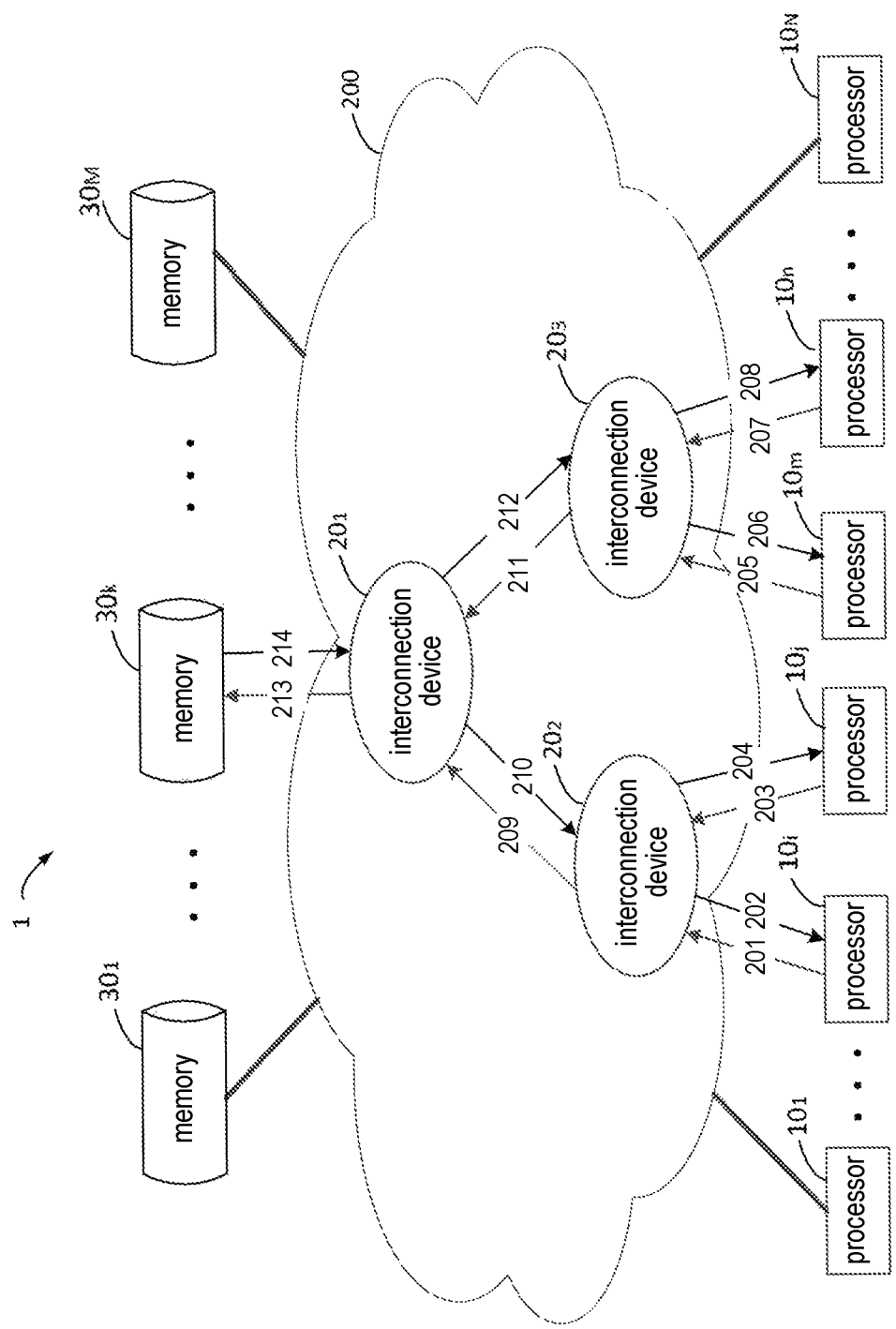
FIG. 1 is a schematic view illustrating a topology of a multi-processor system provided by the related art.

Preferred embodiments of the disclosure will be described in detail with reference to the accompanying drawings hereinafter. Although the preferred embodiments of the disclosure are shown in the drawings, it should be understood that the disclosure may be implemented in various forms and should not be limited by the embodiments set forth herein. On the contrary, these embodiments are provided to make the disclosure more thorough and complete, and to fully convey the scope of the disclosure to a person having ordinary skill in the art.

The term "including" and its variants used in the specification means open-ended inclusion, that is, "including but not limited to". Unless specifically stated, the term "or"

means "and/or". The term "based on" means "based at least in part on." The terms "one embodiment" and "some embodiments" mean "at least one exemplary embodiment". The term "another embodiment" means "at least one additional embodiment". The terms "first", "second", etc. may refer to different or the same objects.

Figure 2:
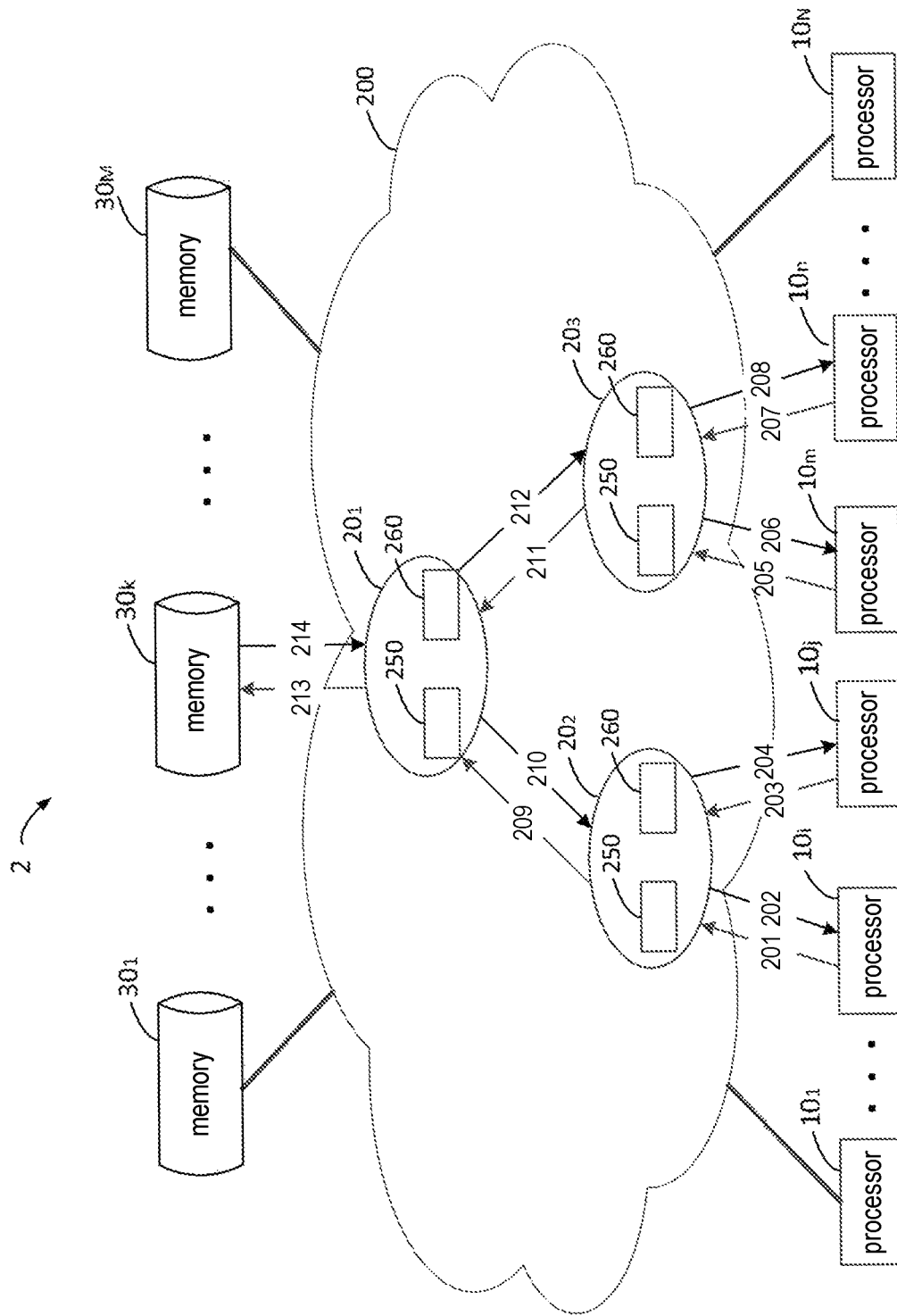
FIG. 2 is a schematic diagram illustrating a topology of a multi-processor system according to an embodiment of the disclosure.

The disclosure provides an interconnection device that minimizes the access bandwidth of the memory and/or the transmission bandwidth on the interconnection network link without changing the general request-response memory access programming model. FIG. 2 is a schematic diagram illustrating a topology of a multi-processor system 2 according to an embodiment of the disclosure. The structure of the multi-processor system 2 shown in FIG. 2 is similar to the structure of the multi-processor system shown in FIG. 1, and the difference is that each of the interconnection devices 20 may include a separate request processing module 250 and/or a response processing module 260. In some embodiments, each of the interconnection devices 20 may be a switch module in a chip-on-chip network, a switch, or a router. In addition to the function of conventional data exchanging, each of the interconnection devices 20 also has the function of the request processing module 250 and/or the response processing module 260 according to the disclosure. A person having ordinary skill in the art may understand that FIG. 2 is only exemplary, and according to actual conditions, the interconnection network 200 of the multi-processor system 2 may include more or less interconnection devices 20.

Generally, in the disclosure, each request processing module 250 is configured to receive a data access request from at least one processor 10 in a multicast group for a target data unit in a destination memory (e.g., the memory $30_k$) among the memories 30. Further, these data access requests are combined into a single request for the target data unit to read the target data unit from the target memory $30_k$.

Herein, depending on a number of previous-hop devices (e.g., the processors 10 or previous-hop interconnection devices 20) connected to each interconnection device 20, numbers of data access requests merged by the request processing modules 250 of the interconnection devices 20 are also different. For instance, as shown in FIG. 2, for the interconnection device $20_2$, the previous-hop devices thereof include the processors $10_i$ and $10_j$, so the interconnection device $20_2$ may merge two data access requests from the processors $10_i$ and $10_j$. Similarly, for the interconnection device $20_3$, the previous-hop devices thereof include the processors $10_m$ and $10_n$, so the interconnection device $20_3$ may merge two data access requests from the processors $10_m$ and $10_n$. For the interconnection device $20_1$, the previous-hop devices thereof include the interconnection devices $20_2$ and $20_3$, so the interconnection device $20_1$ may merge the two merged data access requests from the interconnection devices $20_2$ and $20_3$.

In the embodiments, the multicast group refers to a pre-configured group of processors 10 in the multi-processor system 2. The group of processors 10 may access the same group of data units in the same memory 30 in the same order, and the multicast group includes at least two processors 10. One processor 10 may belong to a plurality of multicast groups at the same time. Further, for each multicast group to which the processor 10 belongs, the processor 10 may read the corresponding group of data units in the same order together with other processors in the multicast group. For instance, it is assumed that one processor 10 belongs to a multicast group A and a multicast group B at the same time, and the processor 10 may read each data unit in a group of data units $D_A$ in the same order together with other processors 10 in the multicast group A. At the same time, the processor 10 may also read each data unit in another group of data units $D_B$ in the same order together with other processors 10 in the multicast group B. In the multi-processor system 2, the processors 10 may be divided into different multicast groups according to data units to be accessed. The processors 10 in each multicast group perform basically the same functions and can access the same group of data units. Herein, the data units refer to a certain amount of memory data that can be accessed through one memory data access request. In an embodiment, one data unit may be dedicated to a specific operation in the multi-processor system 2. For instance, in the multi-processor system 2 for artificial intelligence applications, one data unit may include neural network model parameters that can be accessed in the same order by a multicast group formed by all processors 10, and another data unit may include neural network activation data accessed in the same order by another multicast group formed by part of the processors 10.

Through this merged request method, a data access request for a target data unit in a multicast group may be transmitted only once on each uplink physical link in the route, and uplink bandwidth consumption is thereby reduced.

The destination storage $30_k$ only receives one data access request from the interconnection network 200 (from the interconnection device $20_1$ via the uplink physical link 213, for example), reads the target data unit according to the information of the target data unit in the data access request (e.g., an identifier or an address, etc. of the target data unit), and sends the target data unit to the interconnection network 200 (to the interconnection device $20_1$ via the downlink physical link 214, for example) to act as response data.

Through this way, for a data access request from the processors 10 in a multicast group for a target data unit, the destination memory 30 only needs to perform the read operation once, and memory access bandwidth consumption is thereby reduced.

The response processing module 260 of each of the interconnection devices 20 receives the response data, replicates the response data into one copy or a plurality of copies according to a number of next-hop devices (e.g., the next-hop interconnection devices 20 or the processors 10) of the interconnection device 20, and sends the copy/copies of the response data to each of the next-hop devices. For instance, as shown in FIG. 2, for the interconnection device $20_1$, the next-hop devices thereof include two interconnection devices $20_2$ and $20_3$. Therefore, the interconnection device $20_1$ may make two copies of the response data received from the memory $30_k$ and sends the copies to the interconnection devices $20_2$ and $20_3$ through the downlink physical links 210 and 212, respectively. Similarly, for the interconnection device $20_2$, the next-hop devices thereof include processors $10_i$ and $10_j$. Therefore, the interconnection device $20_2$ may continue to make two copies of the response data received from the interconnection device $20_1$ and sends the copies to the processors $10_i$ and $10_j$ through the downlink physical links 202 and 204, respectively. For the interconnection device $20_3$, the next-hop devices thereof include processors $10_m$ and $10_n$. Therefore, the interconnection device $20_3$ may continue to make two copies of the response data received from the interconnection device $20_1$ and sends the copies to the processors $10_m$ and $10_n$ through the downlink physical links 202 and 204, respectively.

Through this method, for a data access request from the processors 10 in a multicast group for a target data unit, the target data unit only needs to be transmitted once on each downlink physical link in the routing process, and downlink bandwidth consumption is thereby reduced.

Note that in FIG. 2, each interconnection device 20 is shown to include the request processing module 250 and the response processing module 260 to minimize the request and response data on the interconnection network 200, however, this is only exemplary. As a matter of fact, the interconnection device 20 shown in FIG. 2 may only include the request processing module 250 or the response processing module 260, and only some of the interconnection devices 20 may include the request processing modules 250 and/or the response processing modules 260. For instance, the request processing module 250 or the response processing module 260 may be implemented only in the interconnection device 20 (the interconnection device 20₁ shown in FIG. 2) which is directly connected to the memory 30. In this case, the problem of memory access bandwidth consumption may still be solved, and the link bandwidth consumption is partially reduced (the bandwidth consumption on the uplink physical link 213 or the downlink physical link 214, for example, is reduced).

Figure 3:
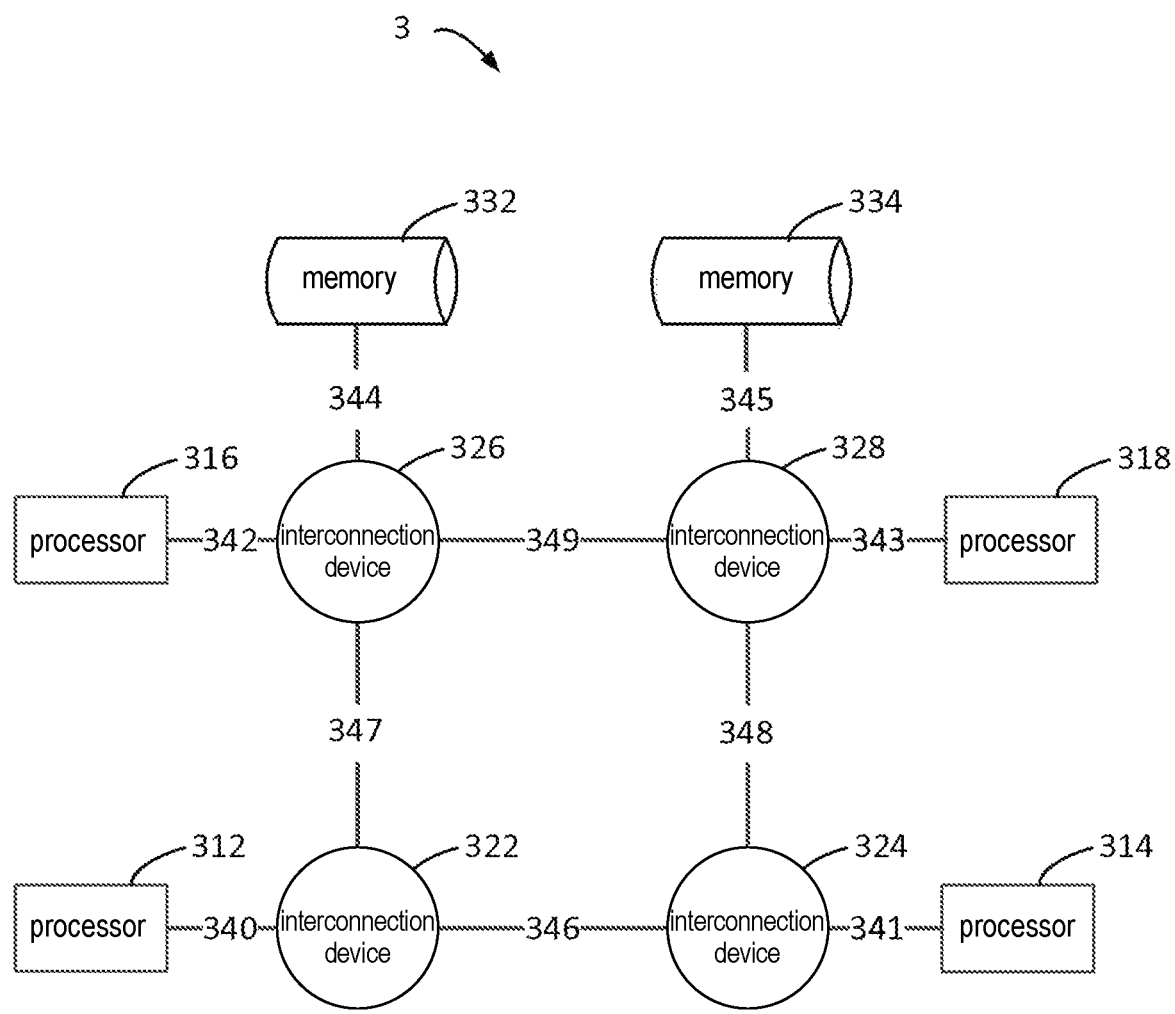
FIG. 3 is a schematic diagram illustrating an exemplary topology of a multi-processor system according to an embodiment of the disclosure.

FIG. 3 is a schematic diagram illustrating an exemplary topology of a multi-processor system 3 according to an embodiment of the disclosure. The multi-processor system 3 may be treated as a simplified example of the multi-processor system 2. As shown in FIG. 3, the multi-processor system 3 includes 4 processors 312, 314, 316, and 318 (same as the processors 10 shown in FIG. 2) and 2 memories 332 and 334 (same as the memories 30 shown in FIG. 2), which are connected together through an interconnection network having 4 interconnection devices 322, 324, 326, and 328 (same as the interconnection devices 20 shown in FIG. 2) and 10 physical links 340 to 349 (similar to the physical links 201 to 214 shown in FIG. 2). Herein, the physical links 340 to 349 are a multiplexed physical line, which includes uplink physical links from the processors to the memories and downlink physical links from the memories to the processors.

Figure 4:
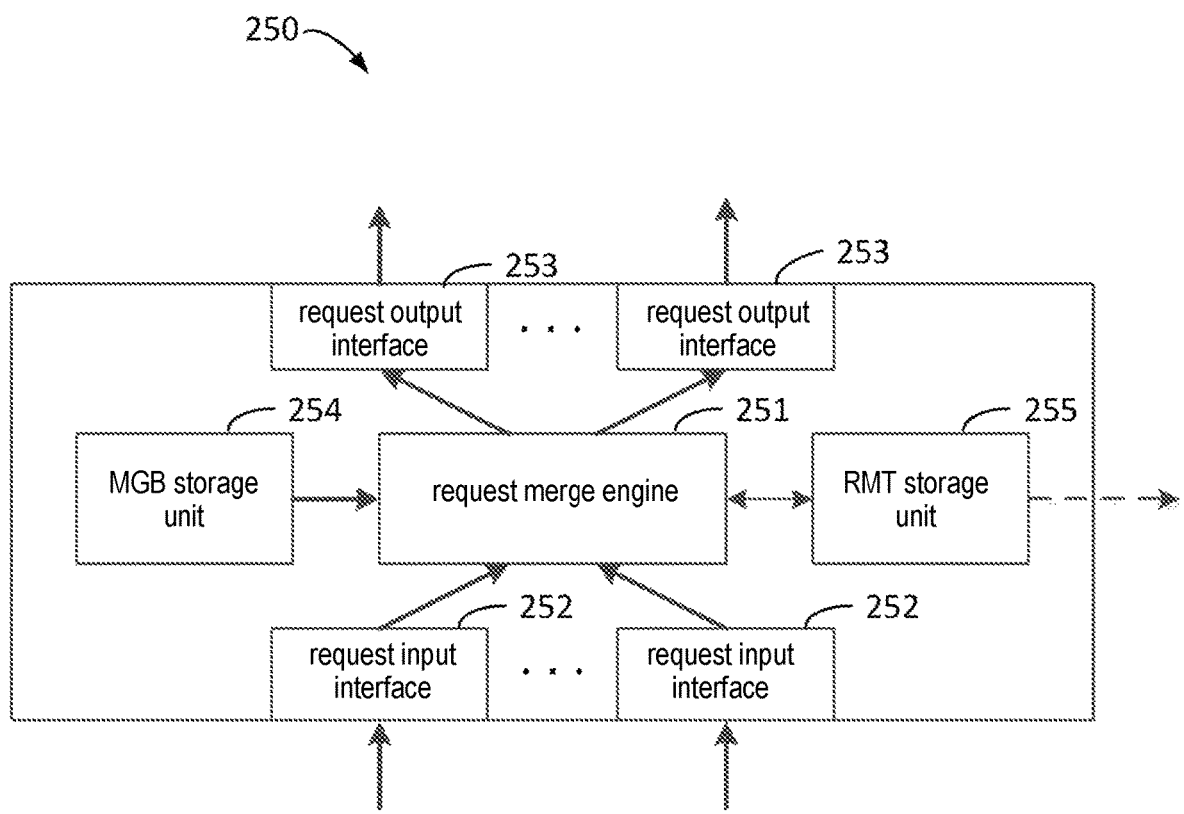
FIG. 4 is a schematic diagram illustrating a structure of a request processing module in an interconnection device according to an embodiment of the disclosure.

FIG. 4 is a schematic diagram illustrating a structure of the request processing module 250 in the interconnection device 200 according to an embodiment of the disclosure. The request processing module 250 of each of the interconnection devices 20 according to the disclosure is to be described in detail below with reference to FIG. 2 to FIG. 4.

As shown in FIG. 4, the request processing module 250 may include a request merge engine 251. The request merge engine 251 is configured to receive data access requests from processors in the multicast group. As provided in the description in combination with FIG. 2, in the multi-processor system 2, the processors 10 may be divided into different multicast groups according to the data units to be accessed. The processors 10 in each multicast group perform basically the same functions and can access the same group of data units. The division of the multicast groups may be performed in the initialization phase of the multi-processor system 2 for a specific application. Once the division is completed, during execution of the application, the multicast groups no longer change, that is, the multicast groups are static. Similarly, for the simplified structure of the multi-processor system 3 shown in FIG. 3, the four processors 312, 314, 316, and 318 may be divided into different multicast groups according to the data units to be accessed. Each multicast group includes at least two processors therein, and the processors in each multicast group perform basically the same functions and can access the same group of data units in the memory 332 or the memory 334. For instance, a first multicast group may be set (for example, a multicast group identifier MGID=0 is assigned to it), which includes all four processors 312, 314, 316, and 318. These processors are programmed to access a group of data units (e.g., neural network model parameters) in the two memories 332 or 334 in exactly the same order. A second multicast group may further be set (for example, a multicast group identifier MGID=1 is assigned to it), which includes two processors 312 and 314. These processors are programmed to only access another group of data units (e.g., neural network activation data) in the memory 332 in exactly the same order. In other words, different multicast groups are created for different member processors or different data units.

Herein, in addition to information related to the requesting processor, the destination memory to be accessed, and the target data unit in the destination memory (e.g., the address or identifier of the requesting processor, the address or identifier of the destination memory, the address or identifier of the target data unit, etc., similar to the data access request in the multi-processor system 1 provided by the related art), the data access request in the multi-processor system 2 or 3 according to the embodiments of the disclosure may further include a merge bit, a multicast group identifier (multicast group ID or MGID), and a multicast transaction identifier (transaction ID or MTID).

The merge bit is configured to indicate whether the data access request is allowed to be merged with other data access requests. A data access request that is allowed to be merged with other data access requests (for example, the merge bit is set to 1) is also referred to as a multicast request in the disclosure, which may be merged with other multicast requests at the interconnection device 20 on a routing path. Correspondingly, a data access request that is not allowed to be merged with other data access requests (for example, the merge bit is set to 0) is referred to as a unicast request in the disclosure and is directly routed to the destination memory through the interconnection network 200. Herein, the "unicast request" and "multicast request" are configured to describe whether to be allowed to be merged with other requests, which in essence are still data access requests for a specific data unit. Therefore, for the convenience of description, in the embodiments, the unicast request and the multicast request (and a merged request to be described in the following paragraphs) are sometimes collectively referred to as a data access request. When constructing the data access request, the processors 10 may set the merge bit of the data access request according to the data unit to be accessed, the multicast group accessing the data unit, etc. For example, if one processor 10 determines that there is no multicast group for the data unit to be accessed, the processor 10 may set the merge bit of the data access request for the data unit to 0. Conversely, the merge bit of the data access request may be set to 1.

The multicast transaction identifier (MTID) is configured to identify outstanding access requests for the same data unit issued by all processors in a multicast group. Each processor 10 needs to assign different MTIDs to different outstanding data access requests in the same multicast group. Herein, the outstanding data access requests refer to data access requests that have not yet received response data for the data access requests and have not timed out. In order to enable the interconnection devices 20 in the routing process to merge the same data access request for the same data unit issued by all processors in the multicast group, all the member processors in the multicast group use the same MTID for this data access request. That is, in the case that the same multicast group sequentially accesses each data unit in the same group of data units in the same order, a different MTID is set for each access, so as to facilitate accurate processing of each request.

In an embodiment, each processor 10 in the multicast group may use a same synchronous increment counter and treats a counter value as the MTID. The initial values of the counters on all member processors 10 of the multicast group are set to the same value (e.g., 0). Whenever each processor 10 in the multicast group sends out a multicast request, the corresponding counter is incremented by 1. Only when a multicast request has been completed, the MTID of the request may be reused for another multicast request.

When the request processing module 250 (furthermore, the request merge engine 251) of one interconnection device 20 receives a data access request from one processor 10 of the multicast group, based on the merge bit in the data access request, the request processing module 250 determines whether the data access request is a multicast request that allows merging with other data access requests.

The request merge engine 251 may determine whether the data access request is a multicast request that allows merging with other data access requests based on the received merge bit in the data access request. If it is determined that the data access request is a multicast request, the request merge engine 251 may determine whether the interconnection device 20 may receive other multicast requests having the same MGID and MTID from other processors 10 in the multicast group based on the MGID and MTID in the data access request and a static routing policy of the multicast group. If it is determined that the interconnection device 20 may receive the other multicast requests having the same MGID and MTID from other processors 10 in the multicast group, the request merge engine 251 obtains the other multicast requests, merges the multicast request with the other multicast requests into a merged request, and forwards the merged request to the next-hop device of the interconnection device 20. For instance, the request merge engine 251 may determine the next-hop device of the interconnection device 20 according to the static routing policy of the multicast group and sends the merged request to the next-hop device.

Herein, similar to the multicast request, the merged request also includes a merge bit, a MGID, and a MTID.

On the other hand, if the request merge engine 251 of the interconnection device 20 determines that the data access request is not a multicast request or determines that the interconnection device 20 may not receive other multicast requests having the same MGID and MTID from other processors 10 in the multicast group, the request merge engine 251 may directly forward the data access request to the next-hop device of the interconnection device 20.

Taking FIG. 3 as an example, it is assumed that the request processing module 250 is implemented in each of all 4 interconnection devices 322, 324, 326, and 328, and a multicast group (for example, MGID=2) including the processors 312 and 314 is provided. When the processor 312 in the multicast group needs to read a target data unit in the memory 334, the processor 312 may generate a data access request with a merge bit of 1 and MGID=2 (i.e., a multicast request). According to the static routing policy of the multicast group MGID=2, the processor 312 sends the data access request to the interconnection device 322. At the interconnection device 322, the request merge engine 251 determines that the data access request may be merged with other data access requests according to the merge bit of the multicast request (that is, the received request is a multicast request). According to the MGID, MTID, and the static routing policy of the multicast group, the request merge engine 251 of the request processing module 250 of the interconnection device 322 determines that the interconnection device 322 may not receive another multicast request having the same MGID and MTID from another processor (i.e., the processor 314) in the multicast group MGID=2 and sends the multicast request from the processor 312 to the interconnection device 324 based on the static routing policy of the multicast group MGID=2. At the interconnection device 324, the request merge engine 251 determines that the data access request may be merged with other data access requests according to the merge bit of the multicast request (that is, the received request is a multicast request). According to the MGID, MTID, and the static routing policy of the multicast group, the request merge engine 251 of the request processing module 250 of the interconnection device 324 determines that the interconnection device 324 may receive another multicast request having the same MGID and MTID from another processor (i.e., the processor 314) in the multicast group MGID=2 and merges the multicast requests from the processor 312 and from the processor 314 for the same target data unit in the memory 334.

In the embodiments, the same static routing policy is used for the same multicast group, that is, each processor 10 in the multicast group may use the same routing policy to address the destination memory 30 through the interconnection network 200. In this way, in the case that a network topology is given, a data access request from one processor 10 in a multicast group for the same target memory 30 may always be routed through the same set of interconnection devices 20. Further, data access requests from plural processors 10 in the same multicast group for the same data unit may be merged at the interconnection devices 20 on the routing path as early as possible. For instance, it is assumed that the above-mentioned multicast group MGID=2 uses x-y routing in the multi-processor system 3 (that is, horizontal transmission is requested first, and vertical transmission to the destination memory is requested next). The multicast request from the processor 312 to the memory 334 may then be routed through the interconnection devices 322, 324, and 328 to the memory 334 via the physical links 340, 346, 348, and 345 in turn. The multicast request from the processor 314 to the memory 334 may be routed through the interconnection devices 324 and 328 to the memory 334 via the physical links 341, 348, and 345 in turn. Therefore, the request merge engine 251 of the request processing module 250 of the interconnection device 322 determines that it may not receive another multicast request having the same MGID and MTID from another processor 314 of the multicast group MGID=2 and thus directly forwards the multicast request received from the processor 312 to the next-hop interconnection device 324. The request merge engine 251 of the request processing module 250 of the interconnection device 324 determines that it may receive a multicast request having the same MGID and MTID from another processor 314 of the multicast group MGID=2 and thus merges the multicast requests from the processor 312 and from the processor 314 for the same target data unit in the memory 334.

Besides, different multicast groups may use different static routing policies. Therefore, in the case where one processor 10 is a member of multiple different multicast groups, its routes to the same destination memory 30 may be different.

Besides, the request processing and response processing of the same multicast group may use different static routing policies. For instance, the request processing process uses a static x-y routing policy, and the response processing process uses a static y-x routing policy (that is, the response data is first transmitted vertically and then transmitted horizontally to the requesting processor).

In the disclosure, to simplify description, the static x-y routing policy is used for the request processing process of all multicast groups, and the static y-x routing policy is used for the response processing process of all multicast groups. Therefore, these static routing policies are sometimes referred to as static routing policies of the multi-processor system 2 or 3 or the interconnection network 200 instead of the multicast groups.

In some embodiments, the request merge engine 251 of the request processing module 250 of the interconnection device 20 further determines whether the generated merged request already includes the data access requests of all processors 10 in the multicast group. If the data access requests of all processors 10 in the multicast group are included, the merge bit of the merged request may be set to indicate unicast (the merge bit is set to 0, for example). If the data access requests of all processors 10 in the multicast group are not included, the merge bit of the merged request may be set to indicate multicast (the merge bit is maintained or is reset to 1, for example).

Taking the foregoing multicast group with MGID=2 as an example, the request merge engine 251 of the request processing module 250 of the interconnection device 324 determines that the generated merged request already includes the data access requests from both the processors 312 and 314 of the multicast group. Therefore, the merge bit of the merged request may be set to 0 to indicate unicast, and the merged request may be converted into a unicast request. The unicast request is routed from the interconnection device 324 to the interconnection device 328 via the physical link 348. The request merge engine 251 of the request processing module 250 of the interconnection device 328 determines that the received request is a unicast request according to the merge bit and therefore directly routes the request to the next-hop device of the interconnection device 328 (the destination memory 334 in the example shown in FIG. 3).

In another embodiment, it is assumed that for a multicast group with MGID=0, 4 processors 312, 314, 316, and 318 are included, and the x-y routing policy is adopted as well. These processors are programmed to access a target data unit in memory 334. In this case, the multicast request from the processor 312 to the memory 334 is routed through the interconnection devices 322, 324, and 328 to the memory 334 via the physical links 340, 346, 348, and 345 in turn. The multicast request from the processor 314 to the memory 334 may be routed through the interconnection devices 324 and 328 to the memory 334 via the physical links 341, 348, and 345 in turn. The multicast request from the processor 316 to the memory 334 may be routed through the interconnection devices 326 and 328 to the memory 334 via the physical links 342, 349, and 345 in turn. The multicast request from the processor 318 to the memory 334 may be routed through the interconnection device 328 to the memory 334 via the physical links 343 and 345 in turn. In this case, similar to the foregoing embodiments, the request merge engine 251 of the interconnection device 324 merges the multicast requests from the memories 312 and 314 and determines that the generated merged request does not include the data access requests of all processors in the multicast group MGID=0. In this case, the interconnection device 324 keeps the merge bit of the generated merged request at 1. That is, the merged request is still a multicast request, and the merged request is transmitted to the interconnection device 328. At the interconnection device 328, the multicast request from the processor 316 via the interconnection device 326, the multicast request from the processor 318, and the merged request from the interconnection device 324 are further merged to generate a new merged request. Moreover, it is determined that the new merged request includes the data access requests of all processors in the multicast group MGID=0, so that the merge bit of the new merged request is set to 0 to indicate unicast.

In the above description, it can be seen that the request processing module 250 of each interconnection device 20 may receive a data access request or a merged request from the previous-hop devices (the processors 10 or the previous-hop interconnection devices 20) thereof and sends the data access request or the merged request to the next-hop devices (the memories 30 or the next-hop interconnect devices 20). Therefore, the request processing module 250 is provided with a request input interface and/or a request output interface to perform the requested input or output.

In some embodiments, the request processing module 250 of each of the interconnection devices 20 further includes a first number of request input interfaces 252 of. The first number is configured to be a maximum number of multicast requests that may be received by the request processing module 250 for accessing the same target data unit from the multicast group. More specifically, if each interconnection device 20 in the interconnection network 200 is provided with the request processing module 250, for one interconnection device 20, a number of the request input interfaces 252 that need to be configured is equal to a number of the physical links leading to the interconnection device 20 based on the static routing policy. On the other hand, if not every interconnection device 20 in the interconnection network 200 is provided with the request processing module 250, for one interconnection device 20, the number of the request input interfaces 252 that need to be provided is equal to a number of the previous-hop interconnection devices 20 having the request processing modules 250 and a number of the processors 10 connected to the previous-hop interconnection devices 20 not having the request processing modules 250.

For instance, in the multi-processor system 3 shown in FIG. 3, if the request processing module 250 is implemented on each of all 4 interconnection devices 322, 324, 326, and 328. For the interconnection device 328, at most one multicast request may be received from each of the physical links 343, 348, and 349. Therefore, 3 request input interfaces 252 are required to be configured on the request processing module 250 on the interconnection device 328, and each request input interface 252 receives a multicast request from one of the physical links 343, 348, and 349.

For another example, in the multi-processor system 3 shown in FIG. 3, if the request processing module 250 is implemented only on the interconnection device (i.e., the interconnection device 326 or 328) directly connected to the memory 332 or 334. For the interconnection device 328, at most 2 data access requests (i.e., the data access requests come from the processors 312 and 314) are provided by the physical link 348, and at most 1 data access request is provided by each of the physical links 343 and 349. Therefore, the request processing module 250 on the interconnection device 328 is required to implement a total of 4 request input interfaces 252.

Herein, each of the request input interfaces 252 of the request processing module 250 is configured to receive data access requests from different processors 10 or for the memories 30 with different purposes. In other words, the data access requests from one processor 10 for the memories 30 with the same purpose are inputted through the same request input interface 252 of the request processing module 250. In contrast, the data access requests from different processors 10 or for memories 30 with different purposes may be inputted through different request input interfaces 252 of the request processing module 250.

For instance, in the multi-processor system 3 shown in FIG. 3, in the interconnection device 328, the multicast request from the processor 312 to the data unit in the memory 334 is always inputted through the request input interface 252 of the request processing module 250 of the interconnection device 328 corresponding to the physical link 348. The multicast requests for data in the memory 334 from two different processors 314 and 316 may come from two different physical links 348 and 349, respectively and thus are respectively inputted through two different request input interfaces 252 of the request processing module 250 of the interconnection device 328 corresponding to the two different physical links 348 and 349.

On the other hand, two multicast requests from the processor 312 to two different memories 332 and 334 may be inputted through the request input interfaces 252 of the request processing modules 250 of the two different interconnection devices 326 and 328, respectively.

In some embodiments, the request processing module 250 of each interconnection device 20 further includes a second number of request output interfaces 253 to send a merged request to the next-hop device of the interconnection device 20 (or directly forward the received data access request when the merge operation is not performed). Herein, the second number is configured be a maximum number of output physical links (i.e., the uplink physical links at each interconnection device 20 shown in FIG. 2) that the interconnection device 20 may use to send the merged request to the memory 30. The maximum number of the out physical links of the interconnection device 20 may be determined based on the topology of the interconnection network 200 and the static routing policy. For instance, in the multi-processor system 3 shown in FIG. 3, if the static x-y routing policy is used for request processing, for the interconnection device 322, it may be configured with 2 request output interfaces, one of which sends a data access request to the interconnection device 326 (and then to the memory 332) via the physical link 347, and the other one sends a data access request to the interconnection device 324 (and then to the memory 334) via the physical link 346. Similarly, for the interconnection device 324, it may be configured with 2 request output interfaces, one of which sends a data access request to the interconnection device 322 (and then to the memory 332) via the physical link 346, and the other one sends a data access request to the interconnection device 328 (and then to the memory 334) via the physical link 348. For the interconnection device 326, it may be configured with 2 request output interfaces, one of which sends a data access request to the memory 332 via the physical link 344, and the other one sends a data access request to the interconnection device 328 (and then to the memory 334) via the physical link 349. For the interconnection device 328, it may be configured with 2 request output interfaces, one of which sends a data access request to the memory 334 via the physical link 345, and the other one sends a data access request to the interconnection device 326 (and then to the memory 332) via the physical link 349.

In addition, the request processing module 250 is configured to output data access requests from the same processor 10 in the same multicast group and inputted through the same request input interface 252 through the same request output interface 253. The processors 10 in each multicast group use the same static routing policy to transmit multicast requests through the interconnection network 200. As such, the data access requests generated by the same processor 10 in the same multicast group to the same destination memory 30 may always pass through the same set of interconnection devices 20 and be inputted and outputted via the same pair {request input interface 252, request output interface 253} of the request processing module 250 of each interconnection device 20 in the set.

Note that one processor 10 may be a member of plural multicast groups. In the case that different multicast groups use different static routing policies, the multicast requests (treated as different multicast requests) sending from the same processor 10 to the same memory 30 but having different MGIDs may pass through different sets of interconnection devices 20. For instance, in the multi-processor system 3 shown in FIG. 3, if a multicast group (e.g., a multicast group with MGID=0) uses static x-y routing, the multicast request from the processor 312 to the memory 334 may pass through the interconnection devices 322, 324, and 328. If another multicast group (e.g., a multicast group with MGID=1) uses static y-x routing, the multicast request from the processor 312 to the memory 334 may pass through the interconnection devices 322, 326, and 328.

By configuring the request input interfaces 252 and the request output interfaces 253 in the request processing module 250, the data access requests (may have different MTIDs) from the same processor 10 in the same multicast group to the same memory 30 always pass through the same request input interface and the same request output interface of the request processing module 250 of each interconnection device 20.

For instance, in the system shown in FIG. 3, all multicast requests from the processor 314 in a multicast group (e.g., the multicast group with MGID=0) to the memory 334 may always reach the same request input interface 252 of the request processing module 250 of the interconnection device 328 corresponding to the physical link 348 and are outputted to the memory 334 from the same request output interface 253. The multicast request from the processor 314 in another multicast group (e.g., the multicast group with MGID=2) to the memory 334 is converted into a unicast request in the interconnection device 324, so that the multicast request may directly pass through the request processing module 250 of the interconnection device 328 without going through the specific request input interface 252 and the request output interface 253. Similarly, the multicast request from the processor 314 in another multicast group (e.g., the multicast group with MGID=2) to a different memory 332 may not pass through the interconnection device 328 either.

As described above, by configuring the request input interfaces 252 and the request output interfaces 253 in the request processing module 250, the data access requests from the same processor 10 in the same multicast group to the same memory 30 always pass through the same request input interface and the same request output interface of each interconnection device 20. In the case that plural multicast groups are provided, each interconnection device 20 maintains the corresponding relationship between the request input interfaces 252 and the request output interfaces 253 for each multicast group to avoid confusion. Herein, the request input interfaces 252 and/or the request output interfaces 253 may be logical or physical interfaces implemented in the request processing module 250.

Accordingly, in some embodiments, the request processing module 250 of each interconnection device 20 may also be configured with a multicast group bitmap (MGB) storage unit 254, which maintains a group of MGBs for each multicast group that can send a multicast request to the interconnection device 20. Herein, each MGB sets 1 bit for each request input interface 252 of the request processing module 250 to indicate whether to receive a multicast request from the request input interface 252.

It is assumed that the request processing module 250 of one interconnection device 20 is configured with Ni request input interfaces 252 and No request output interfaces 253, and it is assumed that multicast requests of at most Ng multicast groups can pass through the request processing module 250.

In this case, a width of each MGB is Ni bits, and one bit corresponds to one request input interface 252. Since the static routing policy is used for the multicast requests, a multicast group may have at most No different MGBs, that is, the MGB storage unit 254 maintains at most No MGBs for one multicast group. In this way, the MGB storage unit 254 is required to store No*Nt MGBs at most and Ni*No*Nt bits at most, where Nt is the largest number of different MTIDs of the multicast group, and Ni, No, Ng, and Nt are all positive integers.

The MGBs in the MGB storage unit 254 may be pre-calculated (calculated by software, for example), downloaded to the request processing module 250 of each interconnection device 20 when each multicast group is established in the multi-processor system 2 or 3, and may be calculated by each request processing module 250 according to the configuration of the multicast groups and the interconnection network 200. A programming example of software to calculate MGB is provided as follows.

For each multicast group,
in the request processing module 250 of each interconnection device 20,
    in each request output interface 253 of the request processing module 250,
    the MGB is initialized to 0,
    for each processor 10, the bit value of the request input interface 252 is calculated based on the static routing policy, and
        the corresponding bit of the MGB is set to 1 if the calculated bit value of the request input interface 252 is not 0.

In this way, for a request output interface 253, if a multicast request can be received from a specific request input interface 252, the bit in the MGB corresponding to the request input interface 252 is set to a predetermined value (e.g., 1). In contrast, if a multicast request cannot be received from a specific request input interface 252, the bit in the MGB corresponding to the request input interface 252 is set to another predetermined value (e.g., 0).

For instance, in the multi-processor system 3 shown in FIG. 3, the MGB set of the multicast group MGID=0 on the interconnection device 326 may be calculated as follows. In an embodiment, it is assumed that the request processing module 250 is implement on each of all four interconnection devices 322, 324, 326, and 328, so that the request processing module 250 of the interconnection device 326 may be configured with 3 request input interfaces 252 receiving multicast requests from {physical link 342, physical link 347, physical link 349}. 2 request output interfaces 253 may also be configured, which send data access requests to {physical link 344, physical link 349}.

The MGB corresponding to the request output interface 253 of the physical link 344 is {1, 1, 1}, which indicates that the interconnection device 326 can receive the data access request from the multicast group MGID=0 from each of the 3 physical links 342, 347, and 349 and output the data access request through the request output interface 253 of the physical link 344.

The MGB corresponding to the request output interface 253 of the physical link 349 is {1, 1, 0}, which indicates that the interconnection device 326 can receive the data access request from the multicast group MGID=0 from each of the 2 physical links 342 and 347 and output the data access request via the request output interface 253 of the physical link 349 without receiving a data access request from the physical link 349. This is because although the interconnection device 326 is connected to each of the physical links 342, 347, and 349, according to the static x-y routing policy of the multi-processor system 3, the interconnection device 326 may only output data access requests from the physical links 342 and 347 to the physical link 349 and may not output data access requests from the physical link 349 to the physical link 349 again.

In another embodiment, it is assumed that the request processing module 250 is implement only on each of the interconnection devices 326 and 328, so that the request processing module 250 of the interconnection device 326 may be configured with 4 request input interfaces 252 receiving multicast requests from {physical link 342, processor 312, processor 314, physical link 349} and further configured with 2 request output interfaces 253 sending data access requests to {physical link 344, physical link 349}.

The MGB corresponding to the request output interface 253 of the physical link 344 is {1, 1, 1, 1}, which indicates that the interconnection device 326 can receive the data access request from the multicast group MGID=0 from each of the physical link 342, the processor 312, the processor 314, and the physical link 349 and output the data access request through the physical link 344.

The MGB corresponding to the request output interface 253 of the physical link 349 is {1, 1, 1, 0}, which indicates that the interconnection device 326 can receive the data access request from the multicast group MGID=0 from each of the physical link 342, the processor 312, and the processor 314 and output the data access request via the request output interface 253 of the physical link 349 without receiving a data access request from the physical link 349.

As mentioned above, the processors 10 in a multicast group may have multiple outstanding data access requests for the same group of data units and use MTID to identify different outstanding data access requests. In this case, each interconnection device 20 maintains the status of the outstanding data access requests for each multicast group.

Accordingly, in some embodiments, the request processing module 250 of each of the interconnection devices 20 may also be configured with a request merge table (RMT) storage unit 255 configured to store status information of outstanding data access requests.

To be specific, in the RMT storage unit 255, one RMT entry may be maintained for each MGID and MTID pair, and the RMT entry may store the received information of the multicast request with the same {MGID, MTID}. The information stored in one RMT entry may include information (e.g., information of the destination memory 30) related to data access requests and the status of a merging process (the number of received data access requests with the {MGID, MTID} pair and information of the corresponding processor 10, for example).

It is assumed that the maximum number of multicast groups that can be supported by the request processing modules 250 of the interconnection devices 20 is MGID_max, and the maximum number of outstanding multicast requests that can be sent by each processor 10 is MTID_max. Therefore, the RMT storage unit 255 needs to implement at most RMT_max=MGID_max*MTID_max entries.

Since it is generally impossible for all multicast groups to have the maximum number of outstanding requests at the same time, in actual implementation, the RMT storage unit 255 may be designed to implement entries fewer than RMT_max entries to save costs.

If the RMT storage unit 255 runs out of all idle entries, the request processing module 250 may stop receiving multicast requests that require a new RMT entry until the idle RMT entry is provided in the RMT storage unit 255 again. For instance, if one interconnection device 20 receives the response data for the {MGID, MTID} pair from the destination memory 30 and sends the response data to the next-hop device, this interconnection device 20 may delete the content of the RMT entry associated with the {MGID, MTID} pair in the RMT storage unit 255 to release the RMT entry.

Upon receiving a multicast request, the request merge engine 251 determines whether the {MGID, MTID} pair of the multicast request exists in an RMT entry in the RMT storage unit 255. If it is determined that the {MGID, MTID} pair of the received multicast request is provided in an RMT entry in the RMT storage unit 255, the request merge engine 251 writes the information of the received multicast request to the RMT entry, such as the information (e.g., the address, identifier, etc. of the processor 10) of the processor 10 issuing the multicast request and may add one to the number of received multicast requests recorded in the RMT entry.

If it is determined that the {MGID, MTID} pair of the received multicast request is not provided in any RMT entry in the RMT storage unit 255, the request merge engine 251 allocates one idle RMT entry for the {MGID, MTID} pair in the RMT storage unit 255 and writes the received multicast request information into the RMT entry. Subsequently-received information of all of the multicast requests with the {MGID, MTID} pair is stored and updated in the RMT entry.

In addition, when merging multiple multicast requests, the request merge engine 251 may merge all the multicast requests in one RMT entry in the RMT storage unit 255 into one merged request. This is because all multicast requests stored in one RMT entry have the same {MGID, MTID} pair, and therefore, have the same destination memory 30 and may be routed to the destination memory 30 through the same path using the same request output interface 253.

Besides, the request merge engine 251 is also configured to determine when to merge the plurality of multicast requests. Specifically, in an embodiment, as described above, each time a multicast request with the {MGID, MTID} pair is received, the request merge engine 251 updates a number of received multicast requests Req_num in the RMT entry associated with the {MGID, MTID} pair. Therefore, the request merge engine 251 may determine whether the number of updated multicast requests Req_num in the RMT entry is equal to a number of bits set to a predetermined value (e.g., 1) in the MGB corresponding to the RMT entry. In this RMT entry, when the number of updated multicast requests Req_num is equal to the number of bits set to the predetermined value in the corresponding MGB, the request merge engine 251 determines that all multicast requests for the MGID and MTID are received and no new multicast requests may be further received, and therefore, merges the received multicast requests into one merged request and sends the merged request.

Alternatively, a timeout mechanism may also be set in the request processing module 250. After the predetermined time passes, when it is determined that not every multicast request for the MGID and MTID is received (some member processors in a multicast group cannot send their multicast requests, for example), the request merge engine 251 merges the received multicast requests into one merged request and sends the merged request.

The interconnection device 20 (e.g., the interconnection device 328 shown in FIG. 3) connected to the destination memory 30 sends the finally generated unicast request to the destination memory 30 (e.g., the memory 334 shown in FIG. 3). The destination memory 30 reads the target data unit requested by the unicast request and sends the target data unit treated as response data to the connected interconnection device 328.

Through the request processing modules 250 in the interconnection devices 20, in an optimal situation (every interconnection device 20 has the request processing module 250), the data access requests from the processors 10 in a multicast group for a target data unit may be transmitted only once on each physical uplink in the route, and uplink bandwidth consumption is thereby reduced.

As described above, in some embodiments, at least some interconnection devices 20 in the multi-processor system may further include the, and each response processing modules 260 replicates one copy or more copies of the response data for the data access request for the multicast group received from the destination memory 30 and sends the copy/copies of the response data to the next-hop device thereof.

Figure 5:
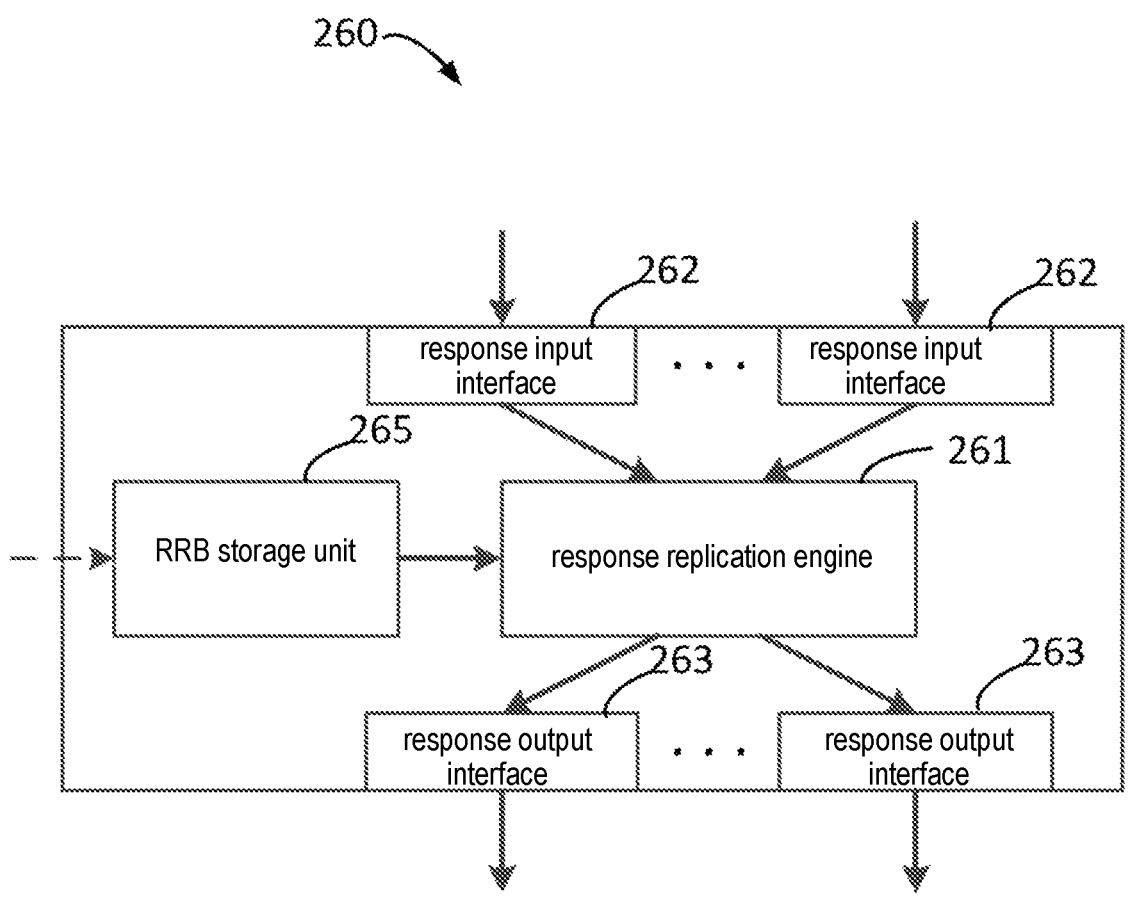
FIG. 5 is a schematic diagram illustrating a structure of a response processing module in each of the interconnection devices according to an embodiment of the disclosure.

FIG. 5 is a schematic diagram illustrating a structure of the response processing module 260 in each of the interconnection devices 20 according to an embodiment of the disclosure.

As shown in FIG. 5, the response processing module 260 may include a response replication engine 261. The response replication engine 261 is configured to receive and treat the target data unit from the destination memory 30 as response data of the data access request from the multicast group for the target data unit. Based on the topology of the interconnection network 200 and the static routing policy, the response replication engine 261 may determine a number of copies of the response data. Herein, the static routing policy in response to data transmission may be different from the abovementioned static routing policy configured for data access requests and thus may be referred to as a second static routing policy hereinafter, which is, for example, a static y-x routing policy.

Taking FIG. 3 as an example, it is assumed that the response processing module 260 is implemented in each of all 4 interconnection devices 322, 324, 326, and 328, and the multicast group MGID=2 includes the processors 312 and 314. The processors 312 and 314 issue data access requests to a target data unit in the memory 334. As described above, according to the static routing policy configured for data access requests, in the interconnection device 324, the data access requests from the processors 312 and 314 are merged, and a unicast request is generated. The unicast request is sent to the target memory 334 via the interconnection device 328, and the interconnection device 328 receives response data for the data access request from the target memory 334. In this case, in the interconnection device 328, according to the topology of the interconnection network 200 and the second static routing policy, the response processing module 260 of the interconnection device 328 may determine that the response data for the data access request of the multicast group MGID=2 needs to be replicated in 1 copy and sends the copy of the response data to the next-hop device (i.e., the interconnection device 324) of the interconnection device 200. In the interconnection device 324, according to the topology of the interconnection network 200 and the second static routing policy, the response processing module 260 of the interconnection device 324 may determine that the response data for the data access request of the multicast group MGID=2 needs to be replicated in 2 copies, one copy is sent to the processor 314 via the physical link 341, and the other copy is sent to the interconnection device 322 via the physical link 346. In the interconnection device 322, according to the topology of the interconnection network 200 and the second static routing policy, the response processing module 260 of the interconnection device 322 may determine that the response data needs to be replicated in 1 copy and sends the copy of the response data to the processor 312 via the physical link 340.

Similar to the request input interface 252 and the request output interface 253 in the request processing module 250, the response processing module 260 may further include one or more response input interfaces 262 and/or one or more response output interfaces 263.

Each response input interface 262 is configured to receive the aforementioned response data (or a copy thereof).

In some embodiments, if the request processing module 250 and the response processing module 260 are both implemented in one interconnection device 20, the response processing module 260 only needs to be configured with a single response input interface 262. In this case, the response replication engine 261 may obtain the RMT entry for the MGID and MTID pair from the RMT storage unit 255 of the request processing module 250 and uses the information in the RMT entry to perform multicast of the response data.

In some other embodiments, one interconnection device 20 may implement only the response processing module 260, and the number of response input interfaces 262 that the response processing module 260 needs to be configured with is the same as the number of physical links from which response data may be received. For instance, in the multi-processor system 3 shown in FIG. 3, the response processing module 260 of the interconnection device 326 needs to implement 2 input response interfaces 262 corresponding to the input physical links 344 and 349.

Each response output interface 263 is configured to send response data (or a copy thereof) back to the requesting processor 10.

In some embodiments, in the interconnection network 200, if every interconnection device 20 is provided with the response processing module 260, the number of response output interfaces 263 of the interconnection device 20 is configured to be the same as the number of output physical links allowing the interconnection device 20 to be connected to the processor 10. For instance, in the multi-processor system 3 shown in FIG. 3, the response processing module 260 of the interconnection device 326 needs to implement 3 response output interfaces 263 corresponding to the physical links 342, 347, and 349.

In some other embodiments, in the interconnection network 200, if not every interconnection device 20 is provided with the response processing module 260 and if none of the interconnection devices 20 on the route for sending the response data to the processors 10 implements the response processing module 260, for each processor 10 directly connected to one interconnection device 20 or each output physical link of the interconnection devices 20 provided with the response processing modules 260 and for the processors 10 not directly connected to the interconnection devices 20, the response processing module 260 of the interconnection device 326 needs to be provided one response output interface 263. For instance, in the multi-processor system 3 shown in FIG. 3, if the response processing modules 260 are only implemented on the interconnection devices 326 and 328, the response processing module 260 on the interconnection device 326 is required to be provided with 4 response output interfaces 263 corresponding to the physical link 342, the physical link 349, the processor 312, and the processor 314.

Similar to the MGB storage unit 254 in the request processing module 250, the response processing module 260 may further include a response replicate bitmap (RRB) storage unit 265, which maintains a group of response replicate bitmaps RRB for each multicast group to determine which response output interface 263 the response data is to be sent to.

In some embodiments, if the request processing module 250 is implemented in the same interconnection device 20, the response processing module 260 can directly obtain its RMT entry from the RMT storage unit 255 of the request processing module 250 as an RRB entry. To be specific, the RMT entry corresponding to the {MGID, MTID} pair of the response data includes the bitmap of the input request interface 252 that receives the multicast request, so that the response processing module 260 may use this bitmap as the RRB of the response data for the multicast request.

In some other embodiments, if the request processing module 250 is not implemented in the same interconnection device 20, the response processing module 260 needs to configure its own RRB in the RRB storage unit 265. Similar to the MGB of the request processing module 250, the RRB in the RRB storage unit 265 may be pre-calculated (calculated by software, for example) and configured, and the response processing module 260 may also directly calculate and generate the RRB according to the configuration of the multicast groups and the interconnection network 200. A programming example of software to calculate RRB is provided as follows.

For each multicast group,
in the response processing module 260 of each interconnection device 20,
   in each response input interface 262 of the response processing module 260,
   the RRB is initialized to 0,
   for each processor 10, the bit value of the response output interface 263 is calculated based on the second static routing policy, and
   the corresponding bit of the RRB is set to 1 if the calculated bit value of the response output interface 263 is not 0.

For instance, in the multi-processor system 3 shown in FIG. 3, if the response processing module 260 is implemented in each of all 4 interconnection devices 322, 324, 326, and 328, in the interconnection device 326, the RRB corresponding to the response input interface 262 of the physical link 344 of the multicast group MGID=0 has a bit value of 1 for the physical links 342 and 347 and has a bit value of 0 for the physical link 349.

The response replication engine 261 of the response processing module 260 replicates the response data received from the response input interface 262 and sends one copy of the replicated response data to the response output interface 263.

In some embodiments, if the request processing module 250 is implemented in the same interconnection device 20, the interconnection device 20 may not request the target data unit from the destination memory 30 until the merging process of the corresponding RMT entry is completed (that is, all multicast requests for the RMT entry arrive at the interconnection device 20) or a timeout occurs.

If the merging process is completed, for a response output interface 262 whose corresponding bit in an RRB entry is a predetermined value (e.g., 1) and for a group of response output interfaces 263 connected to the same next-hop interconnection device 20 that implements the response processing module 260 but does not implement the request processing module 250, the response replication engine 261 sends a copy of the response data to the next-hop interconnection device 20 through one response output interface 263 in the group of response output interfaces 263. For all other response output interfaces 263, the response replication engine 261 sends a copy of the response data to each response output interface 263.

If a timeout occurs before the merging process is completed, the response replication engine 261 sends a copy of the response data to each response output interface 263 among those response output interfaces 263 corresponding request input interface 252 of the request processing module 250 having received the multicast request of the RMT entry. Herein, the response replication engine 261 may use a timeout flag bit to mark each copy of the response data as a timeout response.

In these embodiments, after finishing sending the response data, the response replication engine 261 may release the RMT entry acquired from the RMT storage unit 255.

In some other embodiments, the request processing module 250 is not implemented in the same interconnection device 20. In this case, if the response replication engine 261 marks the received response data as a timeout response, the response replication engine 261 only sends one copy of the response data to its corresponding response output interface 263. Otherwise, the response replication engine 261 sends a copy of the response data to each response output interface 263 whose corresponding bit is 1 in the RRB.

In some other embodiments, instead of merging all the multicast requests after these multicast requests arrive at the interconnection devices 20, the request merge engine 251 of the request processing module 250 of each of the interconnection devices 20 may adopt another merge policy. That is, immediately after the request merge engine 251 receives the first multicast request for one RMT entry, the data access request is sent to the destination memory 30, the response data is received from the destination memory 30, and the response data is stored in the request processing module 250. All subsequent multicast requests with the same {MGID, MTID} pair are recorded in the RMT entry, but they may not generate a new request to the destination memory 30. When the request merge engine 251 determines that all the multicast requests are received or a timeout occurs, the response replication engine 261 sends the response data to each processor 10 according to the method described above. Compared with the merge policy in which all multicast requests are merged after all the multicast requests arrive at the interconnection devices 20, this merge policy may return the response data to the requesting processor 10 with less waiting time. But the disadvantage is that the request processing module 250 needs a buffer space to temporarily store the response data.

Figure 6:
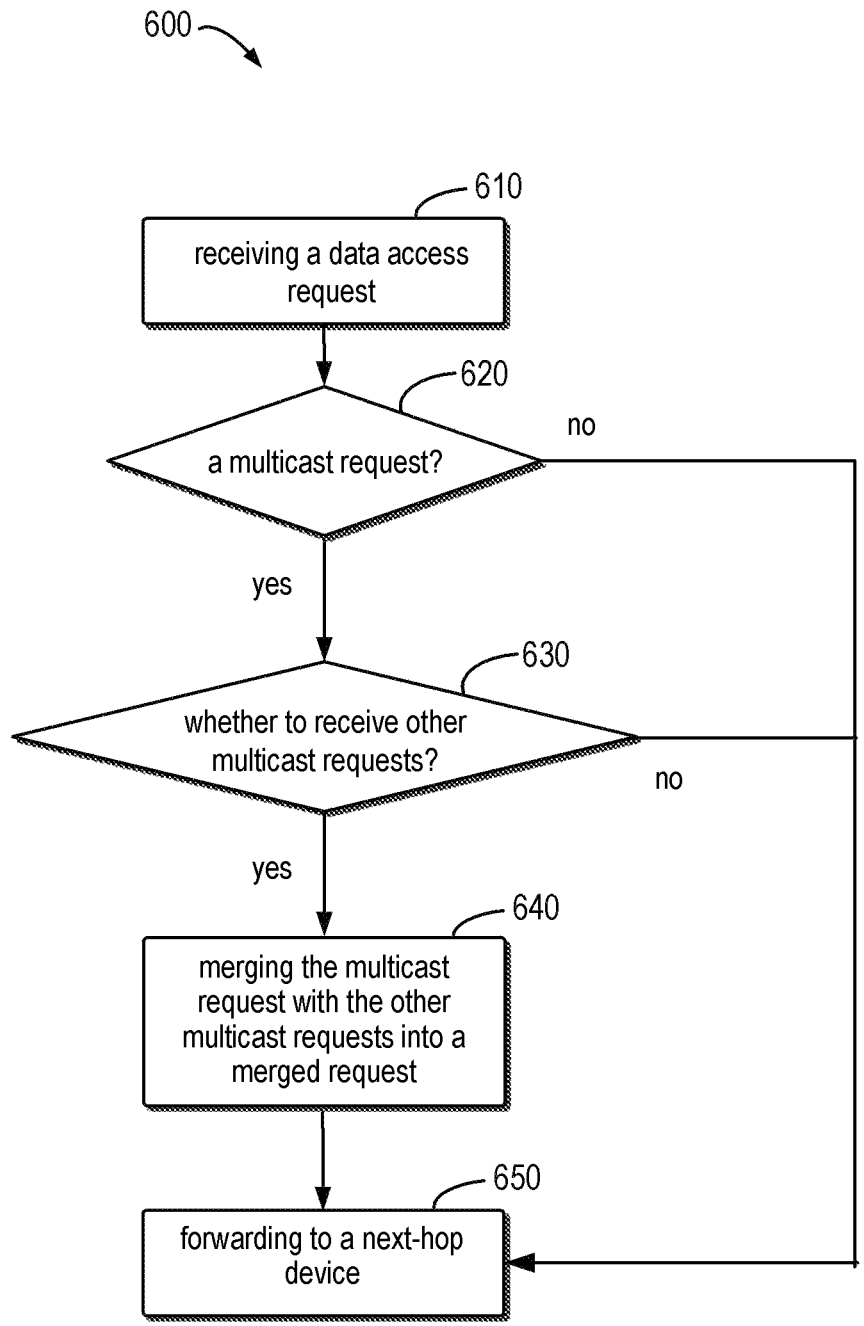
FIG. 6 is a schematic flow chart illustrating an information processing method configured for an interconnection network according to an embodiment of the disclosure.

FIG. 6 is a schematic flow chart illustrating an information processing method 600 configured for the interconnection network 200 according to an embodiment of the disclosure. The information processing method 600 may be executed by, for example, the interconnection devices 20 in the multi-processor system 2 shown in FIG. 2 or the interconnection device 322, 324, 326, or 328 in the multi-processor system 3 shown in FIG. 3 (collectively referred to as the interconnection devices 20 hereinafter).

As shown in FIG. 6, in step S610, an interconnection device 20 receives a data access request from at least one processor in a multicast group of a plurality of processors. The data access request includes a merge bit, a MGID, and a MTID.

In step 620, the interconnection device 20 determines whether the data access request is a multicast request based on the merge bit in the data access request, that is, whether it is allowed to merge with other multicast requests.

If it is determined that the data access request is a multicast request ("yes" is determined in step 620), in step 630, the interconnection device 20 may determine whether the interconnection device 20 may receive other multicast requests having the same MGID and MTID from other processors 10 in the multicast group based on the MGID and MTID and a static routing policy of the multicast group.

If it is determined that the interconnection device 20 may receive the other multicast requests having the same MGID and MTID from other processors 10 in the multicast group ("yes" is determined in step 630), in step 640, the interconnection device 20 obtains the other multicast requests and merges all the multicast requests into a merged request.

To be more specific, in some embodiments, in step 640, the interconnection device 20 may determine whether the merged request includes the data access requests of all processors 10 in the multicast group. If it is determined that the merged request includes the data access requests of all processors in the multicast group, the interconnection device 20 sets a merge bit of the merged request to indicate unicast to convert the merged request into a unicast request. The other interconnection devices 20 on the routing path may determine that the received requests are unicast requests according to the merge bit, that is, it is no longer necessary to merge the received requests.

In some embodiments, in step 640, the interconnection device 20 may use a request merge table (RMT) to perform a merge operation.

To be specific, the interconnection device 20 may determine whether the MGID and MTID pair of the received multicast request is provided in an RMT entry in the RMT storage unit (e.g., the RMT storage unit 255) of the interconnection device 20. If it is determined that the MGID and MTID pair of the received multicast request exists in the RMT entry in the RMT storage unit, the interconnection device 20 adds the information of the processor 10 sending the multicast request to the RMT entry and adds one to a number of received multicast requests recorded in the RMT entry. In contrast, if it is determined that the MGID and MTID pair of the received multicast request does not exist in any RMT entry in the RMT storage unit, the interconnection device 20 allocates an idle RMT entry in the RMT storage unit and adds the information of the multicast request to the idle RMT entry.

The interconnection device 20 records the number of received multicast requests in the RMT entry associated with the MGID and MTID of the data access request and determines whether the number of received multicast requests is equal to the number of bits set to a predetermined value (e.g., 1) in the multicast group bitmap MGB corresponding to the multicast group in the second number of the request output interfaces (e.g., the request output interface 253) of the interconnection device 20. If it is determined that the number of received multicast requests is equal to the number of bits set to the predetermined value in the MGB corresponding to the multicast group in the request output interface 253, the received multicast requests are merged into the merged request.

Next, in step 650, the interconnection device 20 may forward the merged request to the next-hop device according to the static routing policy of the multicast group. Herein, the next-hop device of the interconnection device 20 may be the processor 10 or the next-hop interconnection device 20, as shown in FIG. 2 and FIG. 3.

If it is determined that the data access request is not a multicast request ("no" is determined in step 620) or it is determined that the interconnection device 20 may not receive the other multicast requests having the same MGID and MTID from other processors 10 in the multicast group ("no" is determined in step 630), step 650 of the method 600 is directly performed, and the interconnection device 20 directly forwards the received data access request to the next-hop device.

Besides, the following step (not shown) is further included in the method 600. After response data for the MGID and the MTID is received and the response data is sent to the next-hop device of the interconnection device 20, the interconnection device 20 releases the RMT entry associated with the MGID and the MTID in the RMT storage unit. In this way, the RMT entry in the RMT storage unit may be repeatedly used.

Besides, the following step (not shown) may be further included in the method 600. The interconnection device 20 may receive and treat the target data unit from the destination memory 30 as response data of the data access request from the multicast group for the target data unit, determines a number of copies replicated by the response data, and sends each copy to the next-hop device connected to the interconnection device 20 based on the second static routing policy of the topology of the interconnection network 200. Herein, the next-hop device connected to the interconnection device 20 may be the processor 10 or the next-hop interconnection device 20, as shown in FIG. 2 and FIG. 3.

Figure 7:
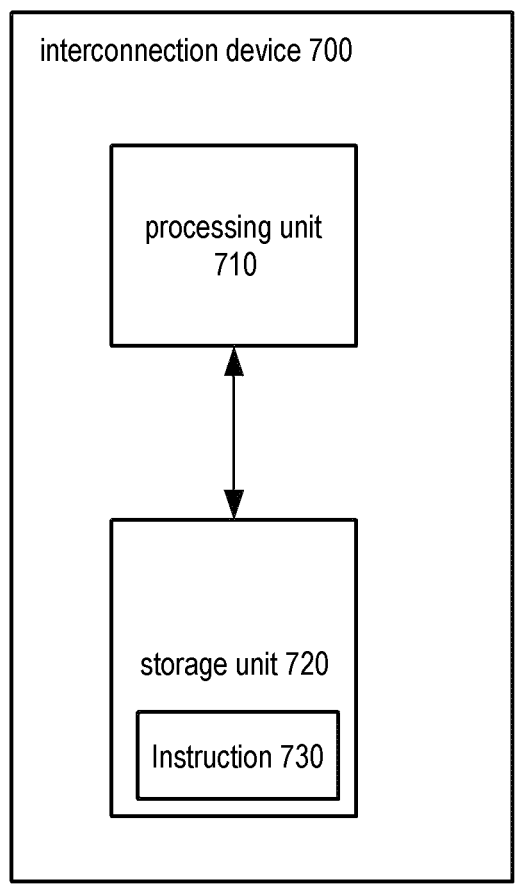
FIG. 7 is a schematic diagram illustrating a structure of an interconnection device according to some embodiments of the disclosure.

FIG. 7 is a schematic diagram illustrating a structure of an interconnection device 700 according to some embodiments of the disclosure. The interconnection device 700 may be the interconnection device 20 or 322, 324, 326, or 328 as described above.

As shown in FIG. 7, the interconnection device 700 may include one or more processing units 710. The processing unit 710 controls the operations and functions of the interconnection device 700. For instance, in some embodiments, the processing unit 710 may perform various operations by means of instructions 730 stored in one or a plurality of storage units 720 coupled thereto. The storage unit 720 may be of any suitable type applicable for the local technical environment and may be implemented using any suitable data storage technology, including but not limited to semiconductor-based storage devices, magnetic storage devices and systems, and optical storage devices and systems. Although only one processing unit 710 and one storage unit 720 are shown in FIG. 7, there may be more physically different processing units 710 and storage units 720 in the interconnection device 700.

The processing unit 710 may be of any suitable type applicable for the local technical environment and may include, but is not limited to, a microprocessor, a digital signal processor (DSP), and the like.

When the interconnection device 700 is used to execute the solution according to the disclosure, the processing unit 710 may be configured (be configured by an instruction 730 in the storage unit 720, for example) to implement the method 600 or the functions of the interconnection devices 20, 322, 324, 326, or 328 described above with reference to FIG. 1 to FIG. 6. Besides, the storage unit 720 may also implement at least one of the MGB storage unit 254, the RMT storage unit 255, and the RRB storage unit 265 described above with reference to FIG. 2 to FIG. 6. All the features described above with reference to FIG. 1 to FIG. 6 are applicable to the interconnection device 700, and description thereof is not repeated herein.

A person having ordinary skill in the art can understand that the method steps described herein are not limited to the order shown exemplarily in the drawings, but can be executed in any other feasible order.

In one or more exemplary designs, hardware, software, firmware, or any combination thereof may be used to implement the functions described in the disclosure. For instance, if implementation is performed by software, the functions can be stored as one or more instructions or codes on a computer-readable medium, or transmitted as one or more instructions or codes on the computer-readable medium.

The various components of the interconnection devices disclosed herein may be implemented using discrete hardware components or may be integrated on one hardware component. For instance, a general-purpose processor, a digital signal processor (DSP), an application-specific integrated circuit (ASIC), a field programmable gate array (FPGA) or other programmable logic devices, discrete gates or transistor logics, discrete hardware components, or any combination used to perform the functions described herein may be used to implement or execute various exemplary logic blocks, modules, and circuits described in combination with the disclosure.

A person having ordinary skill in the art should also understand that the various exemplary logic blocks, modules, circuits, and algorithm steps described in combination with the embodiments of the disclosure may be implemented as electronic hardware, computer software, or a combination of both.

The above description of the disclosure is used to enable any person having ordinary skill in the art to implement or use the disclosure. Various modifications of the disclosure are obvious to a person having ordinary skill in the art, and the general principles defined herein may also be applied to other modifications without departing from the spirit and protection scope of the disclosure. Therefore, the disclosure is not limited to the examples and designs described herein, but is consistent with the broadest scope of the principles and novel features disclosed herein.

What is claimed is:

1. An interconnection device, configured for an interconnection network, wherein the interconnection network comprises a plurality of interconnection devices, and the interconnection devices are connected to a plurality of processors and memories, wherein the interconnection device comprises:

a request processing module is executed by a processor of the interconnection device for receiving a data access request from at least one processor in a multicast group of the processors, wherein the data access request comprises a merge bit, a multicast group identifier (MGID), and a multicast transaction identifier (MTID), and the MTID is configured to identify an outstanding data access request from the multicast group for a target data unit of a destination memory among the memories;

determining whether the data access request is a multicast request based on the merge bit, wherein the multicast request is allowed to be merged with other multicast requests;

determining whether the interconnection device receives other multicast requests if it is determined that the data access request is a multicast request based on the MGID, the MTID, and a static routing policy of the multicast group, wherein the other multicast requests come from other processors in the multicast group and have the same MGID and MTID; and obtaining the other multicast requests if it is determined that the interconnection device receives the other multicast requests, merging the multicast request with the other multicast requests into a merged request, and forwarding the merged request to a next-hop device of the interconnection device;

wherein a memory of the interconnection device comprises:

a request merge table (RMT) storage unit, wherein the RMT storage unit is configured to maintain an RMT entry for each MGID and MTID pair, and the RMT entry comprises information of the processor sending the multicast request having the MGID and MTID pair, a number of received multicast requests, and an address of the destination memory;

wherein the request processing module is further executed by a processor of the interconnection device for recording the number of received multicast requests in the RMT entry associated with the MGID and MTID;

determining whether the number of received multicast requests is equal to a number of bits set to a predetermined value in a multicast group bitmap (MGB) corresponding to the RMT entry; and merging the received multicast requests into the merged request if it is determined that the number of received multicast requests is equal to the number of bits set to the predetermined value in the MGB corresponding to the RMT entry.

2. The interconnection device according to claim 1, wherein the request processing module is further configured for:

forwarding the data access request to the next-hop device if it is determined that the data access request is not a multicast request or it is determined that the interconnection device does not receive the other multicast requests, wherein the next-hop device comprises the destination memory or a next-hop device in the interconnection network.

3. The interconnection device according to claim 1, wherein the request processing module is further configured for:

determining whether the merged request comprises data access requests of all processors in the multicast group; and setting a merge bit of the merged request to indicate unicast to convert the merged request into a unicast request if it is determined that the merged request comprises the data access requests of all processors in the multicast group.

4. The interconnection device according to claim 1, wherein the request processing module comprises:

a first number of request input interfaces, wherein the first number is equal to a maximum number of multicast requests for the target data unit received from the multicast group, the first number is equal to a number of input physical links determined based on the static routing policy if each interconnection device in the interconnection network has the request processing module, and the first number is equal to a number of previous-hop interconnection devices having the request processing module and a number of processors connected to the previous-hop interconnection devices not having the request processing module if not every interconnection device in the interconnection network has the request processing module;

wherein the first number of the request input interfaces are configured to receive data access requests from different processors or data access requests for different memories.

5. The interconnection device according to claim 4, wherein the request processing module further comprises:

a second number of request output interfaces, wherein the second number is equal to a maximum number of output physical links of the interconnection device determined based on the static routing policy and a topology of the interconnection network, wherein the request processing module is configured to output data access requests from the same processor in the same multicast group and inputted through the same request input interface through the same request output interface.

6. The interconnection device according to claim 5, wherein the memory of the interconnection device further comprises:

a MGB storage unit, wherein the MGB storage unit maintains a group of MGBs for the multicast group, and each MGB sets a bit for each request input interface of the first number of the request input interfaces to indicate whether to receive a data access request from the request input interface.

7. The interconnection device according to claim 1, wherein the request processing module is further configured for:

determining whether the MGID and MTID pair of the received multi cast request exists in the RMT entry in the RMT storage unit;

adding the information of the processor sending the multicast request to the RMT entry if it is determined that the MGID and MTID pair of the received multicast request exists in the RMT entry in the RMT storage unit and adding one to the number of received multicast requests recorded in the RMT entry; and allocating an idle RMT entry in the RMT storage unit if it is determined that the MGID and MTID pair of the received multicast request does not exist in any RMT entry in the RMT storage unit and adding the information of the multicast request to the idle RMT entry.

8. The interconnection device according to claim 7, wherein the request processing module is further configured for:

releasing the RMT entry associated with the MGID and the MTID in the RMT storage unit after receiving response data for the MGID and the MTID and sending the response data to the next-hop device of the interconnection device.

9. The interconnection device according to claim 1, further comprising:
a response processing module is executed by a processor of the interconnection device for:
receiving and treating the target data unit from the destination memory as response data of the data access request from the multicast group for the target data unit; and
determining a number of copies replicated by the response data and sending each copy to the next-hop device connected to the interconnection device based on a second static routing policy of a topology of the interconnection network.

10. An information processing method, comprising, through an interconnection device,
receiving a data access request from at least one processor in a multicast group of a plurality of processors, wherein the data access request comprises a merge bit, a multicast group identifier (MGID), and a multicast transaction identifier (MTID), the MTID is configured to identify an outstanding data access request from the multicast group for a target data unit of a destination memory among a plurality of memories, and the processors and the memories are connected through a plurality of interconnection devices of an interconnection network;
determining whether the data access request is a multicast request based on the merge bit, wherein the multicast request is allowed to be merged with other multicast requests;
determining whether the interconnection device receives other multicast requests if it is determined that the data access request is a multicast request based on the MGID, the MTID, and a static routing policy of the multicast group, wherein the other multicast requests come from other processors in the multicast group and have the same MGID and MTID;
obtaining the other multicast requests if it is determined that the interconnection device receives the other multicast requests and merging the multicast request with the other multicast requests into a merged request; and
forwarding the merged request to a next-hop device of the interconnection device;
wherein the step of merging the multicast request with the other multicast requests into the merged request further comprises:
determining whether the MGID and MTID pair of the received multicast request exists in the RMT entry in the RMT storage unit of the interconnection device;
adding the information of the processor sending the multicast request to the RMT entry if it is determined that the MGID and MTID pair of the received multicast request exists in the RMT entry in the RMT storage unit and adding one to a number of received multicast requests received in the RMT entry; and
allocating an idle RMT entry in the RMT storage unit if it is determined that the MGID and MTID pair of the received multicast request does not exist in any RMT entry in the RMT storage unit and adding the information of the multicast request to the idle RMT entry;
wherein the information processing method further comprising:
recording the number of received multicast requests in the RMT entry associated with the MGID and MTID;
determining whether the number of received multicast requests is equal to a number of bits set to a predetermined value in a multicast group bitmap (MGB) corresponding to the multicast group; and
merging the received multicast requests into the merged request if it is determined that the number of received multicast requests is equal to the number of bits set to the predetermined value in the MGB.

11. The information processing method according to claim 10, further comprising:
forwarding the data access request to the next-hop device if it is determined that the data access request is not a multicast request or it is determined that the interconnection device does not receive the other multicast requests, wherein the next-hop device comprises the destination memory or a next-hop device in the interconnection network.

12. The information processing method according to claim 10, wherein the step of merging the multicast request with the other multicast requests into the merged request further comprises:
determining whether the merged request comprises data access requests of all processors in the multicast group; and
setting a merge bit of the merged request to indicate unicast to convert the merged request into a unicast request if it is determined that the merged request comprises the data access requests of all processors in the multicast group.

13. The information processing method according to claim 10, further comprising:
releasing the RMT entry associated with the MGID and the MTID in the RMT storage unit after receiving response data for the MGID and the MTID and sending the response data to the next-hop device of the interconnection device.

14. The information processing method according to claim 10, further comprising:
receiving and treating the target data unit from the destination memory as response data of the data access request from the multicast group for the target data unit; and
determining a number of copies replicated by the response data and sending each copy to the next-hop device connected to the interconnection device based on a second static routing policy of a topology of the interconnection network.

15. A non-transitory computer-readable storage medium, provided with a computer program code, wherein the computer program code is stored in a memory of an interconnection device, and executed by a processor of the interconnection device to:
receive a data access request from at least one processor in a multicast group of a plurality of processors, wherein the data access request comprises a merge bit, a multicast group identifier (MGID), and a multicast transaction identifier (MTID), the MTID is configured to identify an outstanding data access request from the multicast group for a target data unit of a destination memory among a plurality of memories, and the processors and the memories are connected through a plurality of interconnection devices of an interconnection network;
determine whether the data access request is a multicast request based on the merge bit, wherein the multicast request is allowed to be merged with other multicast requests;

determine whether the interconnection device receives other multicast requests if it is determined that the data access request is a multicast request based on the MGID, the MTID, and a static routing policy of the multicast group, wherein the other multicast requests come from other processors in the multicast group and have the same MGID and MTID;

obtain the other multicast requests if it is determined that the interconnection device receives the other multicast requests and merging the multicast request with the other multicast requests into a merged request; and forward the merged request to a next-hop device of the interconnection device;

wherein the step of merging the multicast request with the other multicast requests into the merged request further comprises:

determining whether the MGID and MTID pair of the received multicast request exists in the RMT entry in the RMT storage unit of the interconnection device;

adding the information of the processor sending the multicast request to the RMT entry if it is determined that the MGID and MTID pair of the received multicast request exists in the RMT entry in the RMT storage unit and adding one to a number of received multicast requests received in the RMT entry; and allocating an idle RMT entry in the RMT storage unit if it is determined that the MGID and MTID pair of the received multicast request does not exist in any RMT entry in the RMT storage unit and adding the information of the multicast request to the idle RMT entry;

wherein the computer program code further is executed by the processor of the interconnection device to:

record the number of received multicast requests in the RMT entry associated with the MGID and MTID;

determine whether the number of received multicast requests is equal to a number of bits set to a predetermined value in a multicast group bitmap (MGB) corresponding to the multicast group; and merge the received multicast requests into the merged request if it is determined that the number of received multicast requests is equal to the number of bits set to the predetermined value in the MGB.

\* \* \* \* \*